Dec. 1, 1970  D. E. BEACH  3,544,250

FIRING MECHANISM FOR PERCUSSION-IGNITABLE FLASH LAMPS

Filed Oct. 14, 1968

DAVID E. BEACH
INVENTOR.

BY *John D. Husser*
*Robert W. Hampton*
ATTORNEYS

United States Patent Office 3,544,250
Patented Dec. 1, 1970

3,544,250
FIRING MECHANISM FOR PERCUSSION-IGNITABLE FLASH LAMPS
David E. Beach, Rochester, N.Y., assignor to Eastman Kodak Company, Rochester, N.Y., a corporation of New Jersey
Filed Oct. 14, 1968, Ser. No. 767,142
Int. Cl. F21k 5/02
U.S. Cl. 431—93                          7 Claims

ABSTRACT OF THE DISCLOSURE

A firing mechanism is provided in a photographic apparatus having a striker element located adjacent the firing locus of a primer of a percussion-ignitable flash lamp. The striker element is movable to an energized position, and when released is urged into percussion impact with a flash lamp primer located at the firing locus for igniting the flash lamp.

CROSS-REFERENCE TO RELATED APPLICATIONS

Reference is made to commonly assigned copending U.S. application Ser. No. 765,931, entitled "Socket for Multilamp Flash Unit," filed Oct. 8, 1968, in the name of David E. Beach; and commonly assigned copending U.S. application Ser. No. 766,739, entitled "Apparatus for Actuating Firing of Percussion-Ignitable Flash Lamps and Operating Mechanism Therefor," filed Oct. 11, 1968, in the name of William T. Hochreiter.

BACKGROUND OF THE INVENTION

The present invention relates generally to photographic apparatus, and more specifically to an improved firing mechanism for percussion-ignitable flash lamps.

Before the development of electrically ignitable flash lamps, it was common practice to provide illumination for photographic purposes by igniting a small toner charge. Firing mechanisms for striking a primer or percussion cap were utilized to ignite such flash-powder charges, one such device being disclosed in U.S. Pat. No. 942,941.

With the development of electrically ignitable flash lamps of the type having combustibles enclosed in a light-transmitting envelope, the use of such flash-powder charges decreased because of the safety and convenience of flash lamps. However, the electrically ignitable flash lamps used with most present photographic apparatus have the disadvantage of requiring an electrical source and circuit.

Recently, a flash lamp has been developed which utilizes a percussion-ignitable primer charge to ignite combustibles enclosed in a light-transmitting envelope. A plurality of these lamps have been assembled in a multilamp package in which each lamp has its own reflector and a firing primer that extends to a common bottom wall of the unit. Such percussion-firable multilamp photoflash units and suitable bases and sockets for supporting the units for ignition in indexing rotation in photographic apparatus are disclosed in copending U.S. application Ser. No. 766,739.

When considering the prior art, it is apparent that old techniques for firing powder charges are unsuitable for use with the compact and automatic present-day photographic apparatus. This is so because, among other reasons, such prior art devices do not provide for fast removal and insertion of lamps, indexing rotation of multilamp units, or the energization and release of a percussion striker in synchronism with other cyclic functions of the modern photographic apparatus.

It will also be apparent to one skilled in the art that the more recent techniques for supporting and firing electrically-ignitable multilamp photoflash units, i.e., flashcubes, in photographic apparatus are not suitable for use with the percussion-ignitable unit because more rigid unit support of the percussion-ignitable flash lamps is required. In addition, an entirely different type of cooperation is desired between the percussion-ignitable flash lamps and their firing mechanism in the photographic apparatus than with the electrically-ignitable lamps and their firing mechanism. A firing mechanism of the type which can be advantageously used in photographic apparatus for firing percussion-ignitable flash lamps is disclosed in copending U.S. application Ser. No. 766,739. In the disclosed firing mechanism, a striker element comprising a cantilever spring is provided which in its rest or de-energized position is spaced from the firing locus allowing facile insertion, removal and indexing of lamps. The striker element is movable to an energized position and thereafter released for percussion firing of flash lamps in synchronism with each picture-taking cycle. The improved firing mechanism of this invention, among other things, maximizes the impact velocity of the striker element striking the primer and the energy imparted to the primer.

SUMMARY OF THE INVENTION

This invention includes within its scope an improved firing mechanism for use in photographic apparatus for the dependable firing of percussion-ignitable flash lamps of the type described above. The firing mechanism is movable through a cycle of operation during which the mechanism is energized to a greater extent than heretofore possible, thereafter released for percussion firing of flash lamps in synchronism with a picture-taking cycle, and then re-energized. Upon release of the firing mechanism, stored energy propels a striker element into striking engagement with the primer of an inserted flash lamp, the striker element thereafter being returned to its original energized condition. By virtue of an improved mounting for the striker element in which a fulcrum is provided intermediate the ends of the striker element, the impact velocity of the portion of the striker element striking the primer of the flash lamp and hence the energy imparted thereto is maximized resulting in more dependable and reliable firing of the flash lamps. The operation of the firing mechanism is normally controlled by the shutter release of the photographic apparatus.

It is therefore an object of the present invention to provide an improved firing mechanism for maximizing the energy at impact of a primer for more dependable and reliable firing of percussion ignitable flash lamps.

Another object of the present invention is to provide a firing mechanism for percussion-ignitable flash lamps that is of simple design and construction, thoroughly reliable and efficient in operation, and economical to manufacture.

Objects and advantages other than those set forth above will be apparent from the following description when read in connection with the accompanying drawing.

DESCRIPTION OF THE PREFERRED EMBODIMENTS

Figure 1:
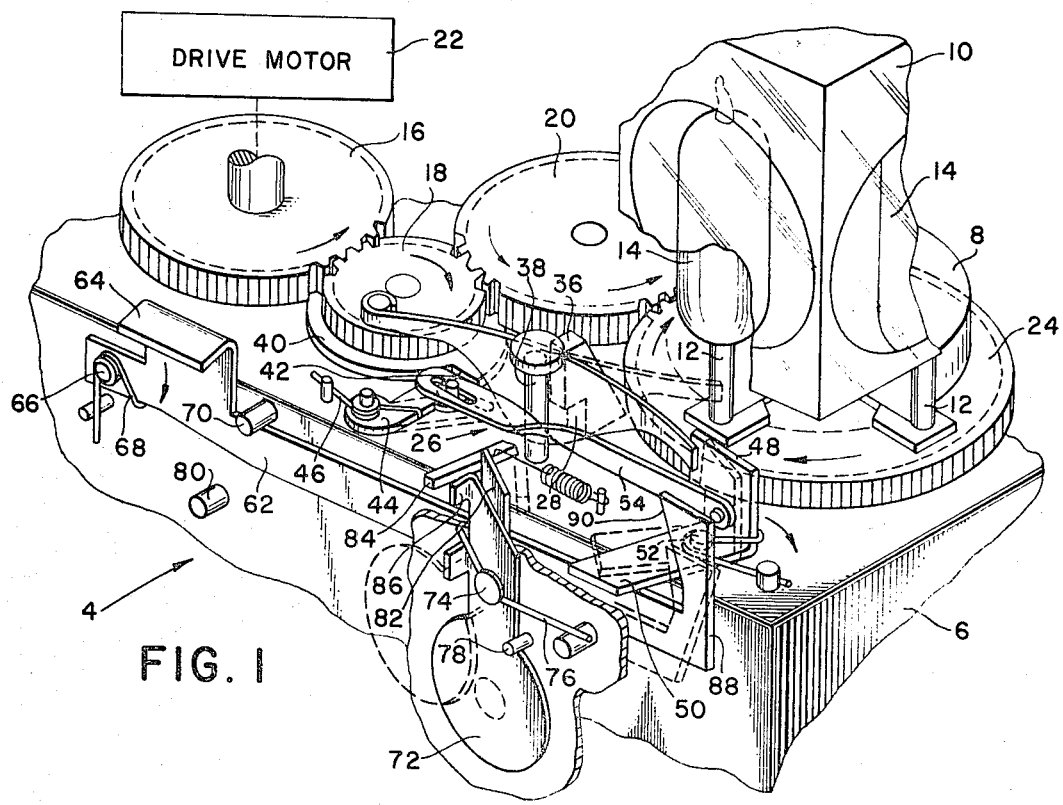
FIG. 1 is a segmental, perspective view of a photographic camera embodying the improved firing mechanism of this invention shown in a normal energized position.

Referring to the drawing, this invention is shown in connection with a photographic apparatus such as a camera 4. Since cameras of the type hereinafter described are generally well known, the present description will be directed in particular to elements forming a part of or cooperating more directly with the present invention, elements not specifically shown or described herein being understood to be selectable from those known in the art.

Referring to FIG. 1, camera 4 has a frame 6 within which a rotatable socket 8, shown in part, is mounted for receiving a percussion-ignitable, multilamp, photoflash unit 10. A socket and photoflash unit of the type usable in this invention is described in detail in copending U.S. application Ser. No. 765,931. Various camera mechanisms are known for providing indexing rotation of a socket in synchronism with other cyclic operations of the camera such as shutter cocking and film advancing. Such indexing of socket 8 and flash unit 10 in 90° increments to position the primers 12 of flash lamps 14 at a firing locus is achieved in camera 4 by a drive gear 16, an energizer gear 18 and an idler gear 20 forming a gear train interconnecting any suitable drive means such as a drive motor 22 to a socket gear 24 on which socket 8 is mounted. The gear ratios are properly selected to advance the socket gear 90° for each picture-taking cycle.

A firing mechanism 26 for firing percussion-ignitable flash lamps 14 comprises a bow-shaped, leaf spring 28 having one end 30 connected to an upturned post 32 on energizer gear 18, its opposite end 34 free, and the portion thereof intermediate its ends interposed between a fulcrum post 38 and a guide rib 36, both secured to camera body 6. A control cam 40 for the camera drive system is secured to gear 18 which is designed by proper selection of gear ratios to make one complete revolution for each quarter of a revolution made by socket gear 24. The control cam has a shoulder 42 that is engageable by a lever 44 biased by a spring 46 into engagement with the periphery of control cam 40 for holding the cam and firing mechanism in a normal rest or energized position. In this rest or energized position, the end 34 of spring 28 is in engagement with a lug 48 on a latch lever 50 pivotally mounted to the frame 6 at 52, and spring 28 is bowed by virtue of the position of latch lug 48, post 38 and pin 32 into a fully energized position. When latch lever 50 is moved in the direction of the arrow in FIG. 1, spring end 34 is released and the energy stored therein whips spring end 34 into percussion impact with a primer 12 located at the firing locus for igniting the primer and its corresponding flash lamp 14. A leaf spring 28 mounted as described was found to urge a striking surface into engagement with a primer 12 with an impact velocity of approximately 1400 inches per second whereas a comparable cantilever spring was found to urge a striking surface into engagement with a primer at a velocity of approximately 900 inches per second.

During movement of latch lever 50 to release spring end 34, lever 44 is momentarily withdrawn from shoulder 42 of control cam 40 by means of an arm 54 having one end pivotally secured to lever 50, and its other end secured to lever 44 by a lost motion pin 56 and slot 58 connection. Release of control cam 40 permits camera drive motor 22 to rotate energizer gear 18 and control cam 40 through a single revolution, further rotation being prevented by virtue of shoulder 42 re-engaging lever 44, and to move socket gear 24 through an increment of 90° to advance a new flash lamp 14 with its primer 12 located at the firing locus. The control cam 40 is released in timed relation to the release of spring end 34 to assure striking of primer 12 before the release of cam 40. This relationship is achieved by a lost motion pin 56 and slot 58 connection, but may be achieved by other suitable means. During the single revolution of control cam 40, spring end 34 is moved in a curved path as denoted by arrows 60 in FIG. 2 to a position in front of latch lug 48. During approximately the last 135° of rotation of energizer gear 18 and control cam 40 from the dotted position of pin 32 as seen in FIG. 2 to its final rest position, spring 28 is energized.

A release means for firing mechanism 26 comprises a shutter release lever 62 having a button 64 which is usually located on the exterior of the camera housing. The shutter release lever 62 is pivotally mounted on a pin 66 and is biased by a spring 68 into engagement with a stop pin 70. A shutter blade 72 pivotally mounted at 74 is biased by a spring 76 into engagement with a stop pin 78. Depression of button 64 and shutter lever 62 in the direction of the arrow as seen in FIG. 1 into engagement with a stop 80 causes a lug 82 on lever 62 to release a tensioned, shutter blade driving arm 84 which strikes a tab 86 on shutter blade 72 and drives it through aperture open and closed positions to make an exposure. The shutter lever 62 has an upwardly extending end 88 having a ramp 90 engageable by latch lever 50. Downward movement of shutter lever 62 causes ramp 90 to move latch lever 50 in a clockwise direction as seen in FIG. 1 to release spring end 34. Pivotal movement of latch lever 50 is transmitted to lever 44 by arm 54, and the lost motion therebetween permits release of spring end 34 for firing of primer 12 before lever 44 releases control cam 40.

Figure 2:
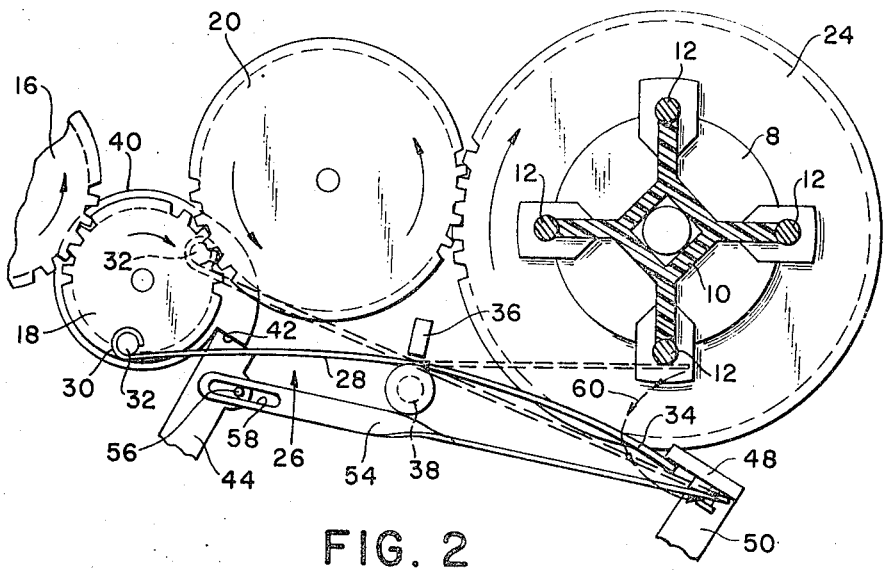
FIG. 2 is a segmental, top plan view of a portion of the camera of FIG. 1 showing the path followed by the striker element during its movement between its energized and de-energized conditions.

In the operation of this invention, let us assume that the camera parts are in their rest position as shown in FIGS. 1 and 2. Momentarily depressing the camera release button 64 moves shutter lever 62 to its dotted position as seen in FIG. 1 releasing driving arm 84 for driving shutter blade 72 to make an exposure in a known way. Movement of shutter lever 62 also releases latch lever 50 for releasing spring end 34, the surface of which strikes primer 12 to ignite a flash lamp 14. Immediately after flash lamp 14 is ignited, lever 44 is withdrawn by virtue of arm 54, and pin 56 and slot 58 connection to release control cam 40 allowing drive motor 22 to drive energizer gear 18 through a single revolution. Such movement of energizer gear 18, in cooperation with lever lug 48 re-energizes firing spring 28, and indexes socket gear 24 through an angle of 90° to present a new flash lamp 14 and primer 12 at the firing locus. Following this cycle of operation, the camera parts return to their normal rest position as seen in FIG. 1 in preparation for another exposure.

The invention has been described in detail with particular reference to a preferred embodiment thereof, but it will be understood that the variations and modifications can be effected within the spirit and scope of the invention.

I claim:

1. Mechanism for cameras of the type having means for detachably receiving and supporting a flash lamp unit which unit is actuable by striking a firing element, the combination comprising:

means defining a striking surface which is movable into striking contact with said firing element;

a leaf spring movable to an energized position for storing potential energy urging said striking surface towards said firing element; and a rib and post positioned to provide a slot for slidably receiving and supporting said spring intermediate its ends.

2. The invention according to claim 1 wherein said striking surface is an integral portion of said spring, and said camera further has energizing means for said spring means comprising a latch for one end of said spring, and movable means connected to the other end of said spring.

3. The invention according to claim 1 wherein said striking surface is an integral portion of one end of said spring, and said camera further has energizing means for said spring means comprising a latch for said one end of said spring, and a rotatably mounted member having a radially spaced part to which the other end of said spring is pivotally mounted.

4. In a camera of the type having means for detachably receiving and supporting a percussion-firable flash lamp with a primer of the flash lamp at a firing locus, the combination comprising:
a striker movable into percussion contact with a primer located at said firing locus;
a bow-shaped leaf spring associated with said striker and movable to an energized position in which said spring stores potential energy urging striker towards said firing locus;
means for slidably supporting said spring intermediate its ends;
latch means for one end of said spring for releasably holding said spring in its energized position; and
energizing means for said other end of said spring cooperating with said latch means for moving said spring relative to said supporting means to said energized position.

5. The invention according to claim 4 wherein said supporting means comprises a fulcrum, and said energizing means comprises a rotatable member having a radially spaced part to which said other end of said spring is pivotally mounted.

6. The invention according to claim 4 wherein said supporting means comprises a rib and a post spaced therefrom to provide a slot therebetween for slidably receiving said spring, and said energizing means comprises a rotatable member having a radially spaced part to which said other end of said spring is pivotally mounted.

7. The invention according to claim 4 wherein said camera further comprises a shutter release level connected to said latch means, and said latch means is responsive to said shutter release lever to release said one end of said spring.

References Cited

UNITED STATES PATENTS

| | | | |
|---|---|---|---|
| 794,189 | 7/1905 | Saunders | 431—92 |
| 942,941 | 12/1909 | Smith | 431—92 X |
| 1,047,243 | 12/1912 | Klein | 431—92 |
| 1,405,011 | 1/1922 | Ryan | 431—269 X |

EDWARD J. MICHAEL, Primary Examiner

U.S. Cl. X.R.

431—269; 95—11.5

PO-1050
(5/69)

UNITED STATES PATENT OFFICE
CERTIFICATE OF CORRECTION

Patent No. 3,544,250     Dated December 1, 1970

Inventor(s) David E. Beach

It is certified that error appears in the above-identified patent and that said Letters Patent are hereby corrected as shown below:

Column 5, line 21, after "urging" insert --said--.

Column 6, line 15, change "level" to --lever--.

SIGNED AND
SEALED
MAR 2 1971

(SEAL)
Attest:

Edward M. Fletcher, Jr.     WILLIAM E. SCHUYLER,
Attesting Officer       Commissioner of Paten